US010865825B2

(12) United States Patent
Smith et al.

(10) Patent No.: US 10,865,825 B2
(45) Date of Patent: Dec. 15, 2020

(54) STRUCTURAL FASTENER

(71) Applicant: Mag Daddy LLC, Cary, IL (US)

(72) Inventors: Michael Walter Smith, Palatine, IL (US); Daniel James Dickinson, Lincolnshire, IL (US)

(73) Assignee: MAG DADDY LLC, Wauconda, IL (US)

( * ) Notice: Subject to any disclaimer, the term of this patent is extended or adjusted under 35 U.S.C. 154(b) by 263 days.

(21) Appl. No.: 16/040,413

(22) Filed: Jul. 19, 2018

(65) Prior Publication Data

US 2020/0025235 A1    Jan. 23, 2020

(51) Int. Cl.
*F16B 37/08* (2006.01)

(52) U.S. Cl.
CPC .......... *F16B 37/0821* (2013.01); *F16B 37/08* (2013.01)

(58) Field of Classification Search
CPC ...... F16B 37/00; F16B 37/08; F16B 37/0821; F16B 37/0835; F16B 37/0842; F16B 37/0857; F16B 37/0864; F16B 37/0885; F16B 37/0892
USPC ................................................. 411/432, 433
See application file for complete search history.

(56) References Cited

U.S. PATENT DOCUMENTS

| | | | | |
|---|---|---|---|---|
| 1,510,492 A | * | 10/1924 | Caron | F16B 37/0885 411/432 |
| 1,887,963 A | * | 11/1932 | Stafford | B60C 29/02 411/433 |
| 1,915,588 A | * | 6/1933 | Arrington | F16B 37/0821 411/433 |
| 3,038,366 A | * | 6/1962 | Hindman | F16B 37/0892 411/433 |
| 3,741,067 A | * | 6/1973 | Moran | F16B 33/006 411/39 |
| 4,083,288 A | * | 4/1978 | Williams | F16B 37/0892 411/436 |
| 4,863,198 A | * | 9/1989 | Petranto | F16L 19/0231 285/39 |
| 4,923,349 A | * | 5/1990 | Logsdon | F16B 37/0892 285/387 |
| 5,226,678 A | * | 7/1993 | Petranto | F16L 19/0231 285/334.5 |
| 6,962,470 B2 | * | 11/2005 | Anscher | F16B 37/0885 411/433 |
| 2008/0179883 A1 | * | 7/2008 | Fullerton | F16B 37/0857 285/330 |
| 2010/0158635 A1 | * | 6/2010 | Rodman | F16B 37/0864 411/432 |

\* cited by examiner

*Primary Examiner* — Roberta S Delisle

(57) ABSTRACT

A multi sectioned nut is operable to attach to a threaded fastener. The multi sectioned nut includes a plurality of multi sectioned threaded nut sections and a turn-lock formed on at least one end of the plurality of threaded nut sections. A cage is detachably coupled to the plurality of nut sections operable to spring open on a side opposite the cage to allow the threaded fastener to pass through. The turn-lock is inserted into a strut slot and rotated to removably attach to the strut slot. According to one embodiment, the multi sectioned nut may include at least two sections.

16 Claims, 12 Drawing Sheets

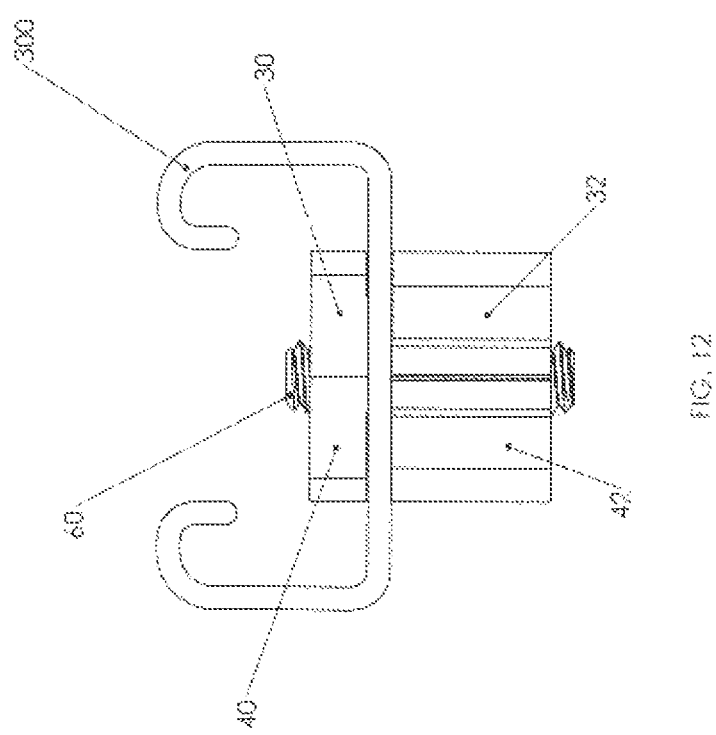

STRUCTURAL FASTENER

FIELD OF THE INVENTION

The invention relates generally to devices for fastening objects, and more particularly to a fastener and strut hangers to secure construction components or to attach onto an engagement structure, such as a chassis, a strut, a hollow substrate, a wall, a plate or any suitable surface.

BACKGROUND OF THE INVENTION

A number of devices and fasteners in building construction are currently available to secure cables or for fastening threaded rods, struts, panels, body panels, building structure, and electrical conduit to the chassis or frame of a building. For example, spring nuts and other devices are used to secure bolts and threaded rods to a strut or truss. Clamps and cable ties are used to secure cables in electrical wiring and boxes. As used herein, a strut refers to a u-shaped bracket having holes to allow for attachment at various points and to facilitate a variety of construction situations. The chassis of the building may include any substrate, plate, roof or ceiling support, structural framework, chassis component or sub-component, support component, wall or any suitable object or combination.

Attaching conduit, electrical boxes, wires or cables to a building structure, electrical box or body panel typically requires securing threaded rods with two bolts to support wires, cable clamps, electrical boxes, screw in cable clamps, straps, tape or clips already fastened to a wire assembly. At least some of the fasteners require extended height or blind insertion and installation of the fasteners in difficult locations because the installer is not able to fully view the fastener or the mounting point on the body panel. These known fasteners require fastening with a wrench, ratchet or screw driver and thus are cumbersome and difficult to install, especially in inaccessible areas. Nor can they be installed without a wrench, ratchet or screw driver for example on an electrical box, conduit or in automobile environments that can be difficult. Further, replacement of an installed, broken nut, rod or strut requires removal and can again be difficult and time consuming.

Conventional nuts such as nuts and spring nuts are placed by hand into a channel of strut to attach other structural components (e.g., another strut, cable hanger, bracket, etc.) to the strut such as a conventional nut described in U.S. Pat. No. 9,103,365 incorporated by reference. Further, two conventional nuts on either side of the strut are required to clamp the rod in place into the strut. However conventional nuts require the installer to hold the nuts in place with one hand while rotating the threaded rod, then threading the second nut with their other hand, requiring two hands. A spring nut requires two hands since an installer inserts the nut and the spring between the channel back and the channel opening while rotating the threaded rod with their other hand.

BRIEF DESCRIPTION OF THE DRAWINGS

FIG. 12 is another side view of a strut and sectioned nut assembly according to one embodiment.

DETAILED DESCRIPTION OF THE PREFERRED EMBODIMENTS

Figure 1:
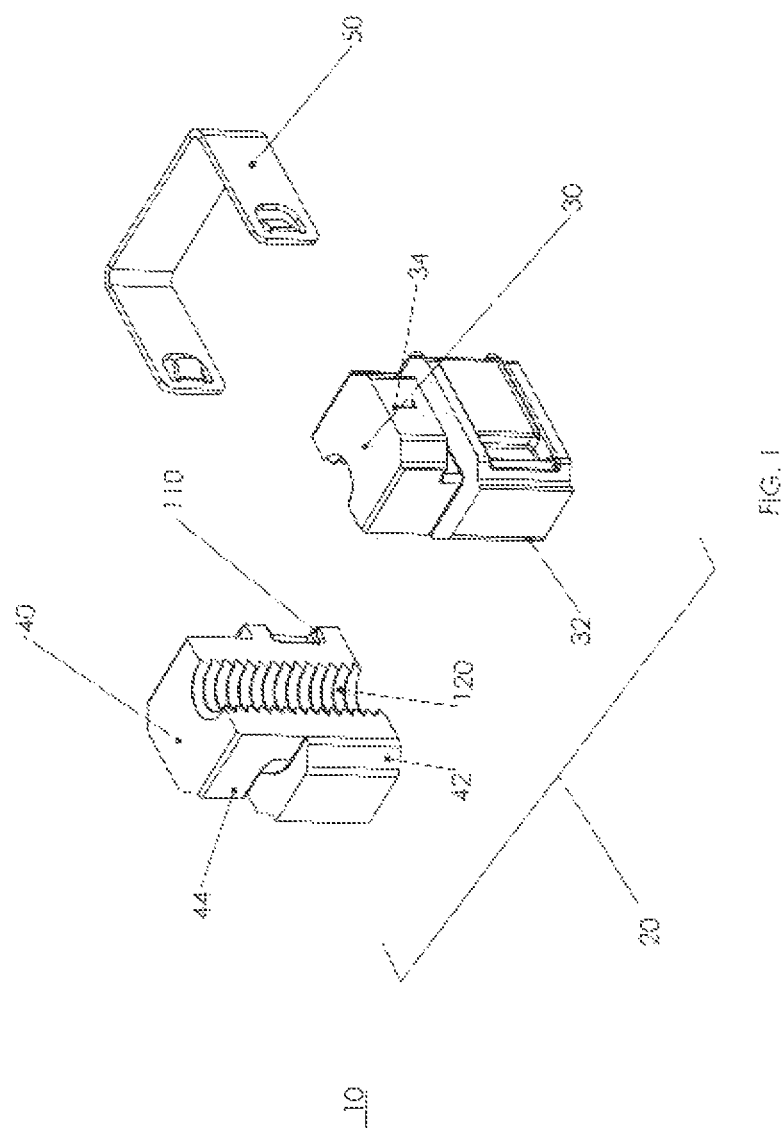
FIG. 1 is an exploded view of a multi sectioned nut according to one embodiment.

A multi sectioned nut is operable to attach to a threaded fastener. The multi sectioned nut includes a plurality of multi sectioned threaded nut sections and a turn-lock formed on at least one end, such as a top, of the plurality of threaded nut sections. A cage is detachably coupled to the plurality of nut sections operable to allow the nut sections spring open on a side opposite the cage to allow the threaded fastener to pass through. The turn-lock is inserted into a strut slot and rotated to removably attach to the strut slot. According to one embodiment, the multi sectioned nut may include at least two sections however multiple sections such as 3, 4, 5, 6, 7, 8 or any suitable number sections are contemplated.

According to one embodiment, the turn-lock has a rectangular shape with rounded edges, to avoid radius interference. The turn lock may have a length that is greater than width thus forms the rectangular shape. The width of the turn-lock is sized to be slightly narrower than the slot width to permit insertion of the turn-lock into the slot. The turn lock is then rotated 90 degrees such that the length of turn lock is greater than the slot width thus securely engaging the turn lock with the strut.

The multi sectioned threaded nut sections and the cage are comprised of at least one of: zinc die cast, machine steel, cast plastic or powdered metal, cindered (pressing powder together), plastic, vinyl, rubber, plastisol, plastic, acetal, polyacetal, polyoxymethylene, nylon, fiberglass, carbon fiber or similar materials. The locking tabs provide a type of hinge between the plurality of multi sectioned threaded nut sections. The locking tabs stabilize and retain the multi sectioned threaded nut sections.

According to one embodiment, wings on each of the ends of the cage engage corresponding depressions on open ends of the multi sectioned threaded nut sections to stabilize and retain the cage on the multi sectioned threaded nut sections.

During installation, the multi sectioned nut may be rotated on the threaded fastener to continuously adapt to variations in height in order to adjust the position of the strut. Thus, only a single multi sectioned nut need be used with a building, chassis or application even if different strut attachment lengths are required at different attachment points.

The multi sectioned nut permits relatively easy insertion of the strut into a building chassis, pillar, structure, door, roof or suitable panel while providing a relatively high level of strength and support. Assembly of the multi sectioned nut onto the threaded fastener or rod is very easy and requires no or a relatively low level of installation effort and as a result provides many ergonomic advantages. The multi sectioned nut eliminates the need for threading a nut on a long threaded rod, and thus significantly reduces the time to attach the nut to the threaded rod assembly. Also, the installer can attach the multi sectioned nut with one hand whereas the prior art conventional nuts require two hands to hold the nuts and the structural construction member. Also, conventional nuts do not self align the nut with the slot opening on the channel back, so readjustment of the first and second nuts is required to align the rod to pass through the slot. In contrast, the multi sectioned nut is automatically self aligned because the turn lock is coupled to the slot and thus no alignment of the rod is required with the slot.

The relatively easy attachment is particularly advantageous for operators who repetitively install multi sectioned nuts onto the building chassis. The relatively easy installation required for inserting the multi sectioned nut into the building chassis may result in fewer injuries to the assembly workers, including injuries related to repetitive stress syndrome. Further by selecting a single multi sectioned nut or reducing the number of different fasteners for different strut lengths and thicknesses, confusion during assembly is eliminated since the same type or a reduced number of fasteners may be used for all or most struts. Thus, an electrician, installer, or assembly worker need not worry about selecting the wrong fastener.

The relatively high level of strength, characteristic of the multi sectioned nut, securely attaches to the building or chassis. Further, the multi sectioned nut quickly and easily adjusts to the threaded fastener and minimizes long tedious threading of nuts on the threaded fastener, stripping threads, rounding hex nut edges, flexing of the threaded fastener and structural members, pushing and bending by operators, vibration and thermal expansion. For example, since conventional top and bottom nuts between the strut are required to clamp the strut, changes in length of the strut or rod requires untightening and re-tightening of the nuts. In contrast, the multi section nut is easily rotated in the strut slot and the multi section nut may be easily rotated for the desired position on the threaded fastener. The multi sectioned nut may also fasten to plastic and/or metal engagement structures. The multi sectioned nut may be made of anti-corrosive material such as plastic or treated metal to provide long reliable service life.

Yet another advantage is that the multi sectioned nut is relatively easy to manufacture using relatively inexpensive manufacturing processes and materials such as casting steel alloy. The use of the multi sectioned nut decreases installation effort and time, assembly and construction costs, increases worker productivity and efficiency, improves reliability and quality and decreases overall assembly, warranty and maintenance costs. The multi sectioned nut improves reliability both in the short term and in the long term, while further improving safety and quality.

FIG. 1 is an exploded view of a multi sectioned nut 10 according to one embodiment. The multi sectioned nut 10 includes a plurality of multi sectioned threaded nut sections 20 and a band 50. According to one embodiment the plurality of multi sectioned nut sections 20 includes two multi sectioned threaded nut sections 30, 40 although any suitable number of sections is contemplated such as 3, 4, 5, 6, 8 or more.

Figure 2:
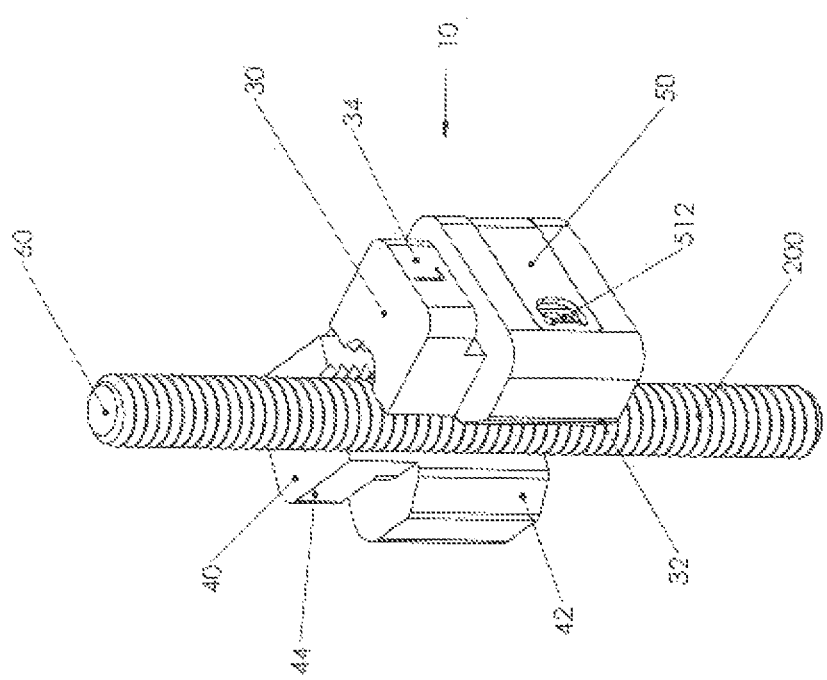
FIG. 2 is a partially assembled view of a multi sectioned nut operable to attach to a threaded fastener according to another embodiment.

FIG. 2 is a partially assembled view of a multi sectioned nut 10 operable to attach to a threaded fastener 60 according to another embodiment. The multi sectioned nut 10 is operable to attach to the threaded fastener 60 by inserting into, pushing and then spreading open the respective tapered sections 32, 42 of threaded nut sections 30, 40 creating an opening for the threaded fastener 60 to pass through.

Figure 5:
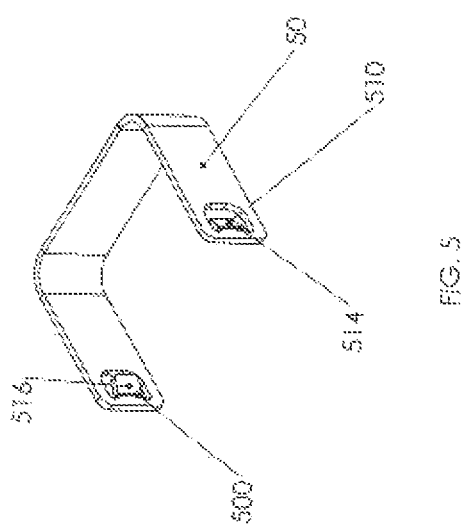
FIG. 5 is a perspective view of a cage according to one embodiment.

FIG. 5 is a perspective view of a cage 50 according to one embodiment. The cage 50 is detachably coupled to the plurality of nut sections 20 (30, 40) and is operable to spring open on an open side of nut sections 30, 40 opposite the cage to allow the threaded fastener 60 to pass into tapered sections 32, 42. The multi sectioned nut 10 includes a plurality of multi sectioned threaded nut sections 20 (30, 40) and a turn-lock 34, 44 formed on at least one end of the plurality of threaded nut sections.

Figure 3:
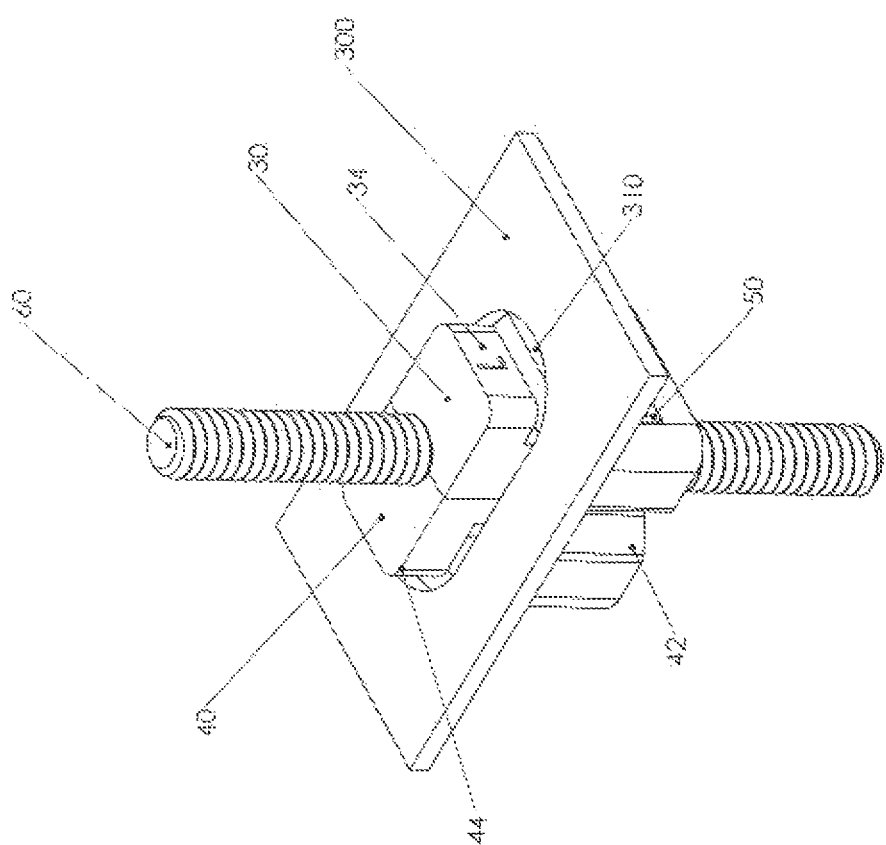
FIG. 3 is a view of a strut and sectioned nut assembly according to one embodiment.

FIG. 3 is a view of a strut 300 and sectioned nut assembly according to one embodiment. As shown the turn lock 34, 44 is shown in the strut slot 310 before turning in an unlocked position. The turn-lock 34, 44 is inserted into a strut slot 310 and the turn lock 34, 44 is rotated to a locked position to removably attach to the strut slot 310. The turn-lock 34, 44 may be rotated 90 degrees according to one embodiment into the locked position.

Figure 4:
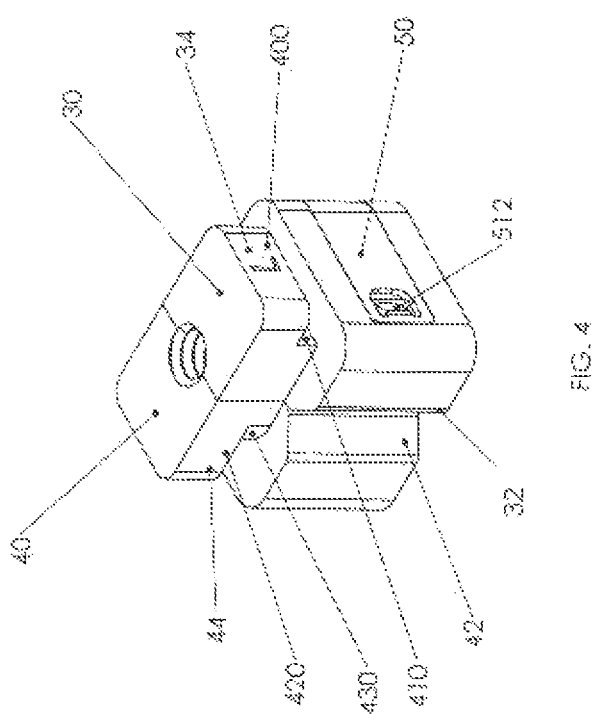
FIG. 4 is a perspective view of a plurality of multi sectioned threaded nut sections according to one embodiment.

FIG. 4 is a perspective view of a plurality of multi sectioned threaded nut sections 30, 40 according to one embodiment and further showing the turn lock 34, 44 details. Turn lock 34 further includes a flange 400 to engage an edge portion of the strut slot 310 when in a locked position, and groove 410, 430 to accommodate a lip or edge of the strut slot 310 to permit sufficient clearance of the strut slot 310 rim when rotated. Turn lock 44 further includes a flange 420 to engage a portion of the strut slot 310 when in a locked position, and groove 430 to permit sufficient clearance of the strut slot 310 rim. The groove 410, 430 form a boss or stand-off width similar to or slightly smaller than the width of the strut slot 310 in order to sufficiently engage the strut slot and provide the desired amount of attachment or detachment force when in a locked position. According to one embodiment, the turn-lock 34, 44 has rectangular shaped flanges 400, 420 with rounded edges, to avoid radius interference. The turn lock 34, 44 may have a length that is greater than width thus forming the rectangular shape. The width of the turn-lock 34, 44 is sized such slightly narrower than the slot width to permit insertion of the turn-lock into the slot as shown in FIG. 3. The turn lock 34, 44 is then rotated 90 degrees such that the length of turn lock 34, 44 is greater than the slot width thus securely engaging the turn lock with the strut. The rounded edges are sized such that a radius from the center of the turn lock to the closest edge of the strut permits rotation in the channel. The turn lock to rotate 90 degrees while maximizing length and thus strength.

FIG. 5 is a perspective view of a cage 50 according to one embodiment. According to one embodiment, wings 500, 510 on each of the ends of the cage 50 engage corresponding depressions 512 (shown in FIG. 2) and 502 (not shown) on open ends of the multi sectioned threaded nut sections to stabilize and retain the cage 50 on the multi sectioned threaded nut sections 30, 40. According to one embodiment, the wings 500, 510 include corresponding prongs 514, 516 to engage the corresponding depressions 512 (shown in FIG. 2) and 502 (not shown) thus preventing the nut sections 30, 40 from escaping the cage 50. Thus cage 50 provides a springing hold on the nut sections 30, 40 to allow nut sections 30, 40 to open and then close and thus enclose the nut sections 30, 40 together and to further allow the threads 120 on the nut sections to engage the threads 200 on the threaded fastener 60.

The multi sectioned threaded nut sections 20, 32, 42 and the cage 50 may be comprised of at least one of: zinc die cast, machine steel, cast plastic or powdered metal, cindered (pressing powder together), plastic, vinyl, rubber, plastisol, plastic, acetal, polyacetal, polyoxymethylene, nylon, fiberglass, carbon fiber, or similar materials.

Figure 6:
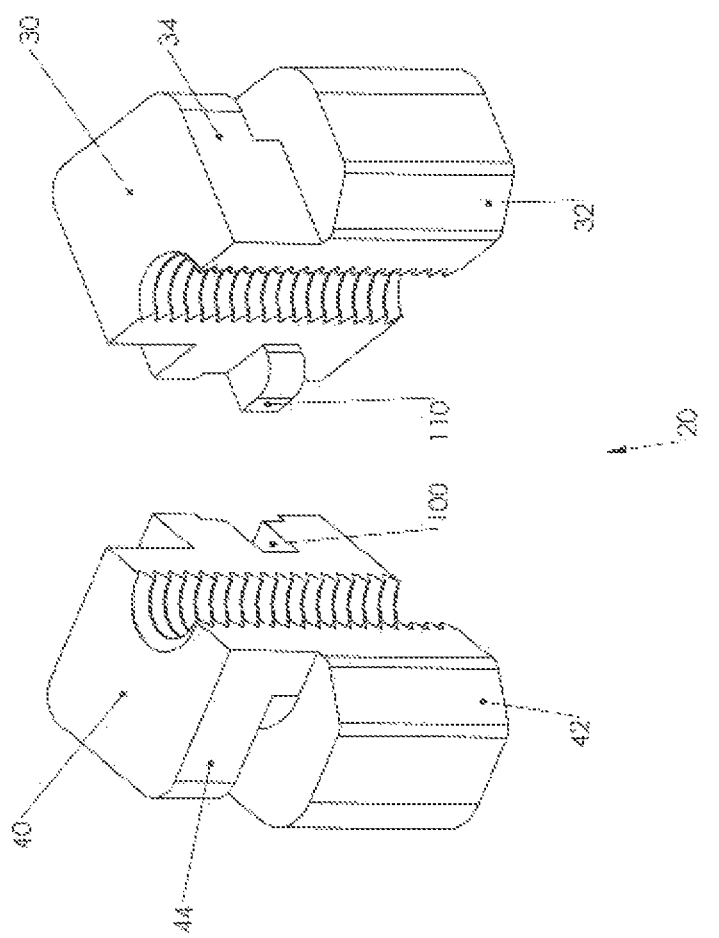
FIG. 6 is a exploded view of a plurality of multi sectioned threaded nut sections according to one embodiment.

FIG. 6 is a exploded view of a plurality of multi sectioned threaded nut sections according to one embodiment prior to attachment of the cage 50. The locking tabs 100, 110 provide a hinge function for the plurality of multi sectioned threaded nut sections 30, 40 to permit opening of the nut sections 30, 40 as described above. Locking tab 110 may be a prong having a curve as shown in FIG. 6 to permit rotation about and pivoting between the nut sections 30, 40. Corresponding locking tab 100 has a corresponding shape and form to rotatable engage locking tab prong 110.

Figure 7:
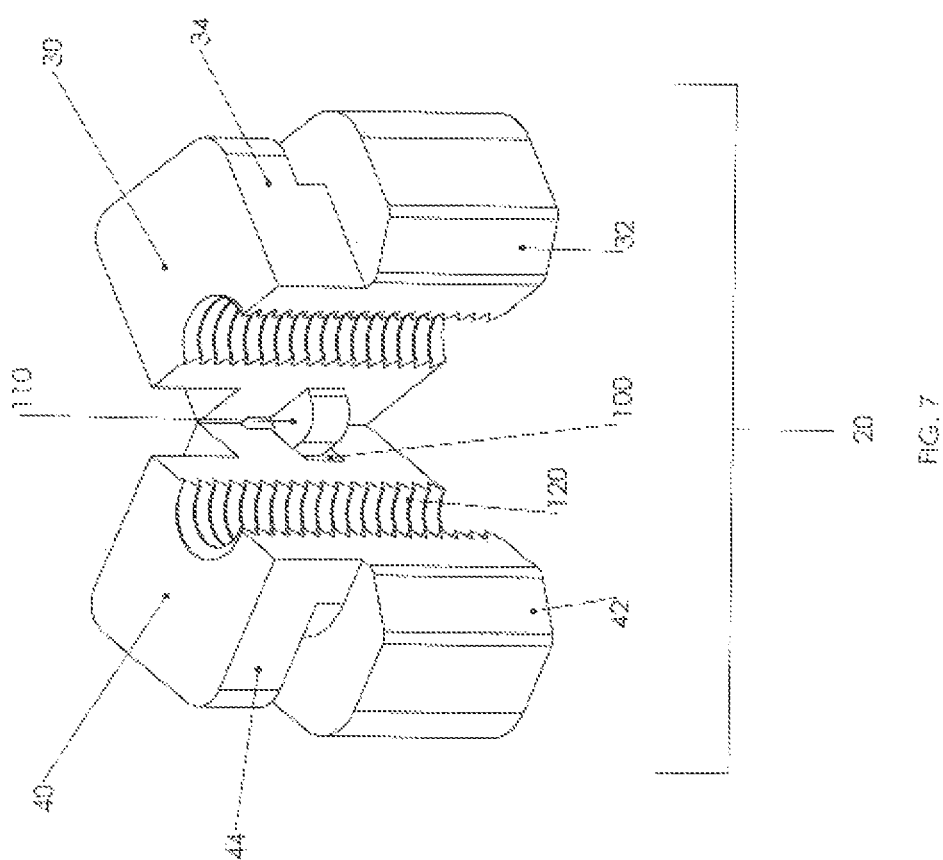
FIG. 7 is a view of a partially assembled multi sectioned nut assembly

FIG. 7 is a view of a partially assembled multi sectioned nut assembly. According to one embodiment, nut section 30 has a tongue 100 or tab and nut section 40 has a locking groove 110. The locking tabs 100, 110 are shown aligning and keeping nut sections 30, 40 while providing an opening suitable for threaded rod 60.

Figure 8:
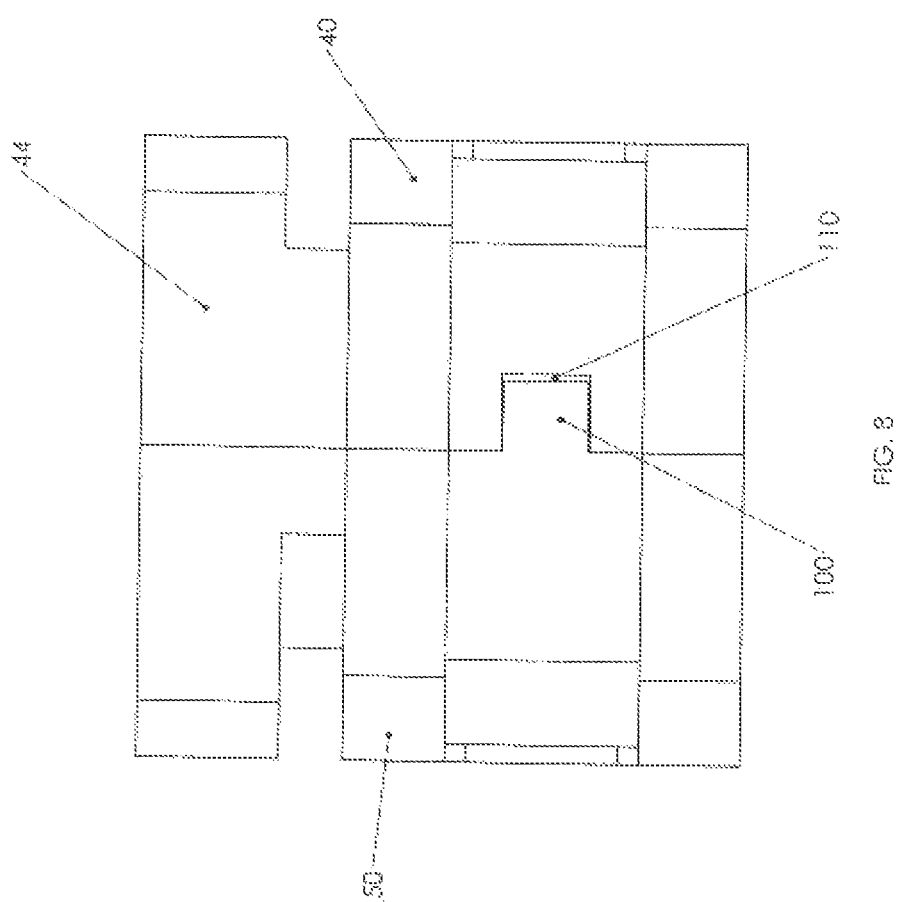
FIG. 8 is a side view of a plurality of multi sectioned threaded nut sections according to one embodiment.

FIG. 8 is a side view of a plurality of multi sectioned threaded nut sections according to one embodiment showing the locking tabs 100, 110 coupled. The locking tabs 100, 110 stabilize and retain the multi sectioned threaded nut sections 30, 40 when in a closed position such as when in compression with the cage 50. As a result, the sections 30, 40 form a stable joint and thus do not slip or slide apart axially either when the nut sections 30, 40 are in either open or closed positions.

Figure 9:
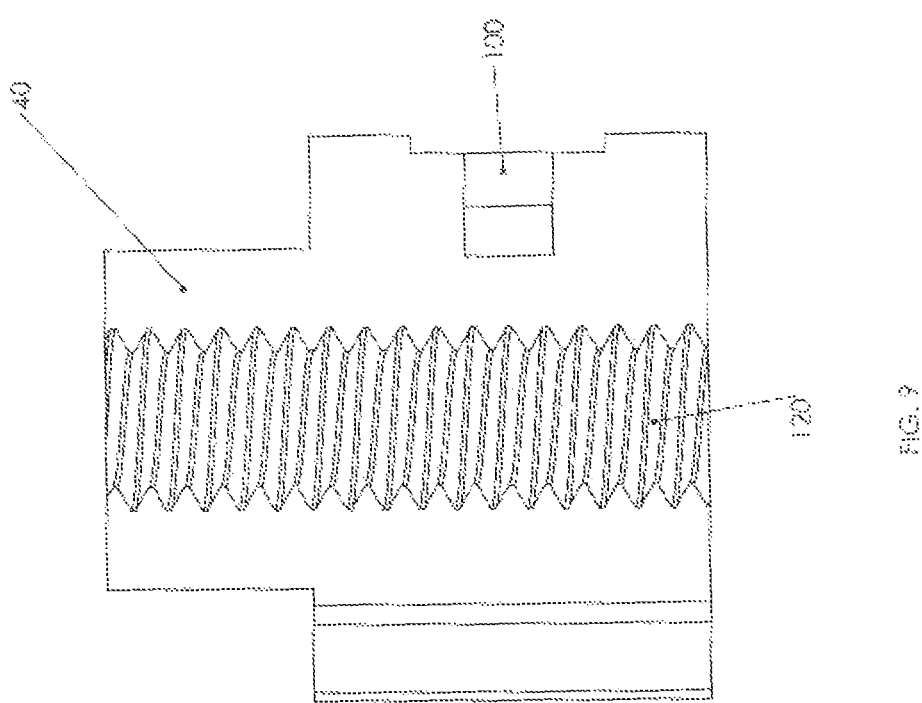
FIG. 9 is a cross section view of a plurality of multi sectioned threaded nut sections according to one embodiment.

FIG. 9 is a cross section view of a plurality of multi sectioned threaded 120 nut section 40 according to one embodiment. Locking tab 100 is shown.

Figure 10:
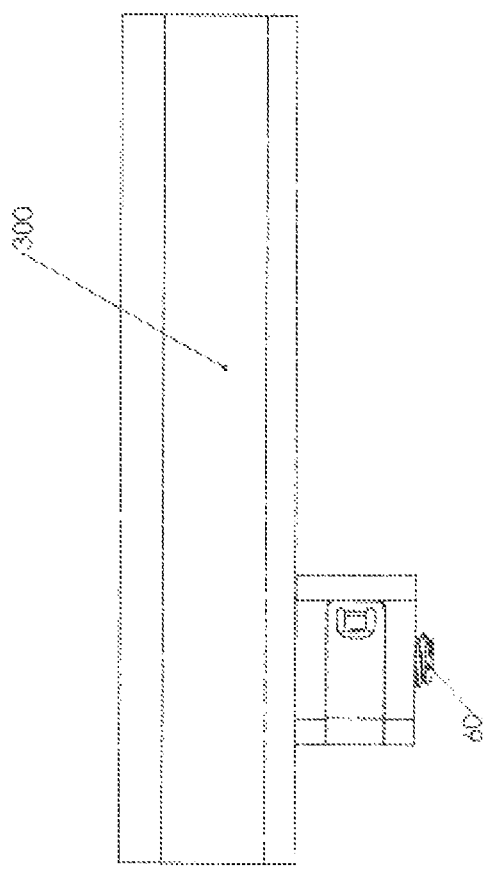
FIG. 10 is a side view of a strut and sectioned nut assembly according to one embodiment.

FIG. 10 is a side view of a strut and sectioned nut 10 assembly attached to a structural member 300 according to one embodiment. The nut may be inserted into any suitable slot 310 of the structural member 300.

Figure 11:
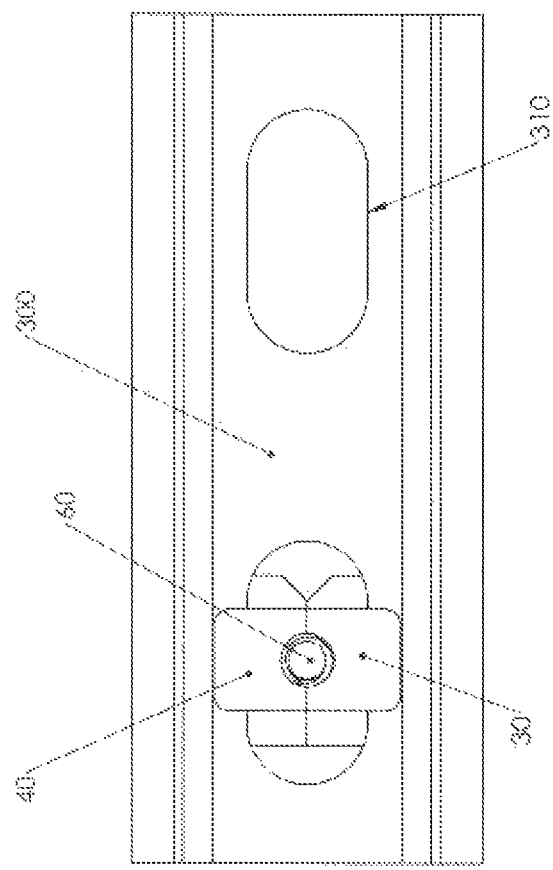
FIG. 11 is a top view of a strut and sectioned nut assembly according to one embodiment.

FIG. 11 is a top view of a strut and sectioned nut assembly 10 attached to a structural member 300 according to one embodiment. The nut assembly 10 is shown in the locked position. The nut may be inserted into any suitable slot 310 of the structural member 300.

FIG. 12 is another side view of a strut and sectioned nut assembly according to the embodiment of FIG. 11 rotated 90 degrees. During installation the multi sectioned nut 10 may be rotated to continuously adapt to variations in height in order to adjust the position of the strut 300. For example, if the rod 60 is affixed to a ceiling or support, then the height of the strut 300 may be raised or lowered simply by rotating the nut 10 from the strut 300 and adjusting the position of the rod 60 and rotating the nut 10 into a locked position. The position of the nut 10 may be raised or lowered by rotating the nut 10 along the rod 60 or by pushing the nut 10 out then snapping it back in at the desired rod 60 height or position. Thus, only a single type or size of multi sectioned nut 10 need be used with a building, chassis or application even if different strut attachment lengths are required at different attachment points.

The multi sectioned nut permits relatively easy insertion of the strut into a building chassis, pillar, structure, door, roof or suitable panel while providing a relatively high level of strength and support. Assembly of the multi sectioned nut 20 onto the threaded fastener or rod 60 is very easy and requires no or a relatively low level of installation effort and as a result provides many ergonomic advantages. The multi sectioned nut 10 eliminates the need for threading a conventional unsectioned nut on a long threaded rod, and thus significantly reduces the nut—threaded rod assembly. Also, the installer can attach the multi sectioned nut 10 with one hand whereas the prior art conventional nuts require two hands to hold the nut and the structural construction member.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A multi sectioned nut operable to attach to a threaded fastener, comprising:
    a plurality of multi sectioned threaded nut sections;
    a turn-lock formed on at least one end of the plurality of threaded nut sections, wherein the turn-lock has a length greater than a width and is inserted into a strut slot and rotated to removably attach to the strut slot; and
    a cage detachably coupled to the plurality of nut sections operable to spring open on a side opposite the cage to allow the threaded fastener to pass through.

2. The multi sectioned nut of claim 1 comprising two multi sectioned threaded nut sections.

3. The multi sectioned nut of claim 1 wherein the multi sectioned nut is operable to attach to at least one of: a suitable wire, cable, conduit, electrical box, an adjustable strap, and a tie wrap.

4. The multi sectioned nut of claim 1 wherein the turn-lock has a rectangular shape with rounded edges, to avoid radius interference.

5. The multi sectioned nut of claim 1 wherein at least one of: the multi sectioned threaded nut sections and the cage are comprised of at least one of: zinc die cast, machine steel, cast plastic or powdered metal, cindered (pressing powder together), plastic, vinyl, rubber, plastisol, plastic, acetal, polyacetal, polyoxymethylene, nylon, fiberglass and carbon fiber.

6. The multi sectioned nut of claim 1 further comprising locking tabs on corresponding plurality of multi sectioned threaded nut sections.

7. The multi sectioned nut of claim 1 further comprising wings on each of the ends of the cage to engage corresponding depressions on (open ends) of the multi sectioned threaded nut sections.

8. A sectioned nut operable to attach to a threaded fastener:
    a first and a second sectioned threaded nut sections hinged via locking tabs;
    a turn-lock formed on at least one end of the first and second threaded nut sections, wherein the turn-lock is inserted into a strut slot and rotated to removably attach the threaded fastener to the strut slot; and
    a cage detachably coupled to the first and second nut sections operable to spring open on a side opposite the cage to allow the threaded fastener to pass through.

9. The sectioned nut of claim 8 further comprising wings on each of the ends of the cage to engage corresponding depressions on (open ends) of the multi sectioned threaded nut sections.

10. The sectioned nut of claim 8 wherein the turn-lock has a rectangular shape with rounded edges, to avoid radius interference.

11. The sectioned nut of claim 8 wherein at least one of: the multi sectioned threaded nut sections and the cage are comprised of at least one of: zinc die cast, machine steel, cast plastic or powdered metal, cindered (pressing powder together), plastic, vinyl, rubber, plastisol, plastic, acetal, polyacetal, polyoxymethylene, nylon, fiberglass and carbon fiber.

12. The sectioned nut of claim 8 wherein the locking tabs hold the first and second nut sections and prevents twisting.

13. A strut and sectioned nut assembly comprising:
a threaded fastener:
a first and a second sectioned threaded nut sections hinged via locking tabs;
a turn-lock formed on at least one end of the first and second threaded nut sections operable to be inserted into a strut slot and rotated to removably attach the threaded fastener to the strut slot; and
a cage detachably coupled to the first and second nut sections operable to spring open on a side opposite the cage to allow the threaded fastener to pass through.

14. The assembly of claim 13 further comprising wings on each of the ends of the cage to engage corresponding depressions on (open ends) of the multi sectioned threaded nut sections.

15. The assembly of claim 13 wherein the turn-lock has a rectangular shape with rounded edges, to avoid radius interference.

16. The assembly of claim 13 wherein the locking tabs hold the first and second nut sections and prevent twisting.

\* \* \* \* \*